US010542766B2

(12) United States Patent
Cocchi et al.

(10) Patent No.: US 10,542,766 B2
(45) Date of Patent: Jan. 28, 2020

(54) MACHINE AND METHOD FOR MAKING LIQUID OR SEMI-LIQUID PRODUCTS

(71) Applicant: ALI GROUP S.r.l.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernuscosul (IT)

( * ) Notice: Subject to any disclaimer, the term of this patent is extended or adjusted under 35 U.S.C. 154(b) by 133 days.

(21) Appl. No.: 15/451,693

(22) Filed: Mar. 7, 2017

(65) Prior Publication Data

US 2017/0273335 A1 Sep. 28, 2017

(30) Foreign Application Priority Data

Mar. 22, 2016 (IT) ........................ 102016000030027

(51) Int. Cl.

| | |
|---|---|
| ***A23G 9/16*** | (2006.01) |
| ***A23G 9/20*** | (2006.01) |
| ***A23G 9/22*** | (2006.01) |
| ***A23G 9/40*** | (2006.01) |
| ***A23G 9/42*** | (2006.01) |

(52) U.S. Cl.

CPC ................. *A23G 9/16* (2013.01); *A23G 9/20* (2013.01); *A23G 9/224* (2013.01); *A23G 9/40* (2013.01); *A23G 9/42* (2013.01)

(58) Field of Classification Search

CPC . A23G 9/045; A23G 9/12; A23G 9/16; A23G 9/20; A23G 9/224; A23G 9/227; A23G 9/40; A23G 9/42

USPC .................................................... 99/455, 470

See application file for complete search history.

(56) References Cited

U.S. PATENT DOCUMENTS

| | | | | |
|---|---|---|---|---|
| 3,818,716 A * | 6/1974 | Carpigiani | ............... | A23G 9/16 62/178 |
| 6,324,964 B1 | 12/2001 | Niederberger et al. | | |
| 2014/0165845 A1 | 6/2014 | Issar | | |
| 2015/0096322 A1 | 4/2015 | Cocchi et al. | | |
| 2015/0223490 A1 * | 8/2015 | Cigolini | .................. | A23G 9/12 99/455 |

FOREIGN PATENT DOCUMENTS

| | | |
|---|---|---|
| JP | H0488950 A | 3/1992 |

* cited by examiner

*Primary Examiner* — Tu B Hoang
*Assistant Examiner* — Tiffany T Tran
(74) *Attorney, Agent, or Firm* — Shuttleworth & Ingersoll, PLC; Timothy Klima

(57) ABSTRACT

A machine for making liquid or semi-liquid products comprises:

- a container adapted to contain a liquid or semi-liquid base product;
- a thermal treatment system associated with the container to cool or heat the walls of the container;
- a stirrer equipped with a plurality of radial vanes and, in use, mounted inside the container to mix the liquid base product inside the container; the machine being characterized in that it further comprises a basket having a plurality of through openings on its walls, defining an internal space for containing flavorings or the like and, in use, mounted inside the container.

10 Claims, 4 Drawing Sheets

MACHINE AND METHOD FOR MAKING LIQUID OR SEMI-LIQUID PRODUCTS

This application claims priority to Italian Patent Application 102016000030027 filed Mar. 22, 2016, the entirety of which is incorporated by reference herein.

BACKGROUND OF THE INVENTION

This invention relates to a machine and a method for making and dispensing products generically defined as liquid or semi-liquid, in particular of the ice cream sector.

More specifically, by way of non-limiting example, reference is made in this description to machines for making and dispensing ice cream.

In machines of this kind, the part which constitutes the core of the machine is a cylinder known in the trade as batch freezing cylinder.

In effect, this part is in the form of a metal cylinder having cooling means distributed around the outside of (or within) its sidewalls and designed to reduce the temperature inside the cylinder in order to mix and cool a base product contained therein to make the finished product (ice cream).

Inside the cylinder, the machine is equipped with a power-driven stirrer which not only mixes the base product continuously to make the finished ice cream as smooth as possible but, at the same time, also causes the finished ice cream to advance towards a dispensing nozzle.

One particular need felt by operators in the trade is that of being able to make flavored ice cream products.

Up to the present, operators in the trade add flavoring preparations to the product inside the batch freezing cylinder so it is stirred into the product while the batch freezer is in operation: this solution, however, is not possible with certain kinds of natural flavorings (e.g. vanilla pods, tea leaves), in particular, infusion products: flavorings of this kind would leave unwanted residues in the finished product which the end consumer would find unpalatable.

SUMMARY OF THE INVENTION

This invention has for an aim to provide a machine and a method for making liquid or semi-liquid products to allow liquid or semi-liquid products flavored with natural flavorings to be made in a particularly quick, easy and practical manner.

A further aim of this invention is to provide a machine and a method for making liquid or semi-liquid products to allow the liquid or semi-liquid products to be flavored with natural flavorings and which, at the same, allow cleaning and maintenance to be carried out particularly easily.

These aims are fully achieved by the machine and method as disclosed herein.

BRIEF DESCRIPTION OF THE DRAWINGS

This and other innovative features of the invention, together with its advantages, will become more apparent from the following description of a preferred embodiment of it, illustrated by way of non-limiting example in the accompanying drawings, in which.

DESCRIPTION OF THE PREFERRED EMBODIMENTS

Figure 1:
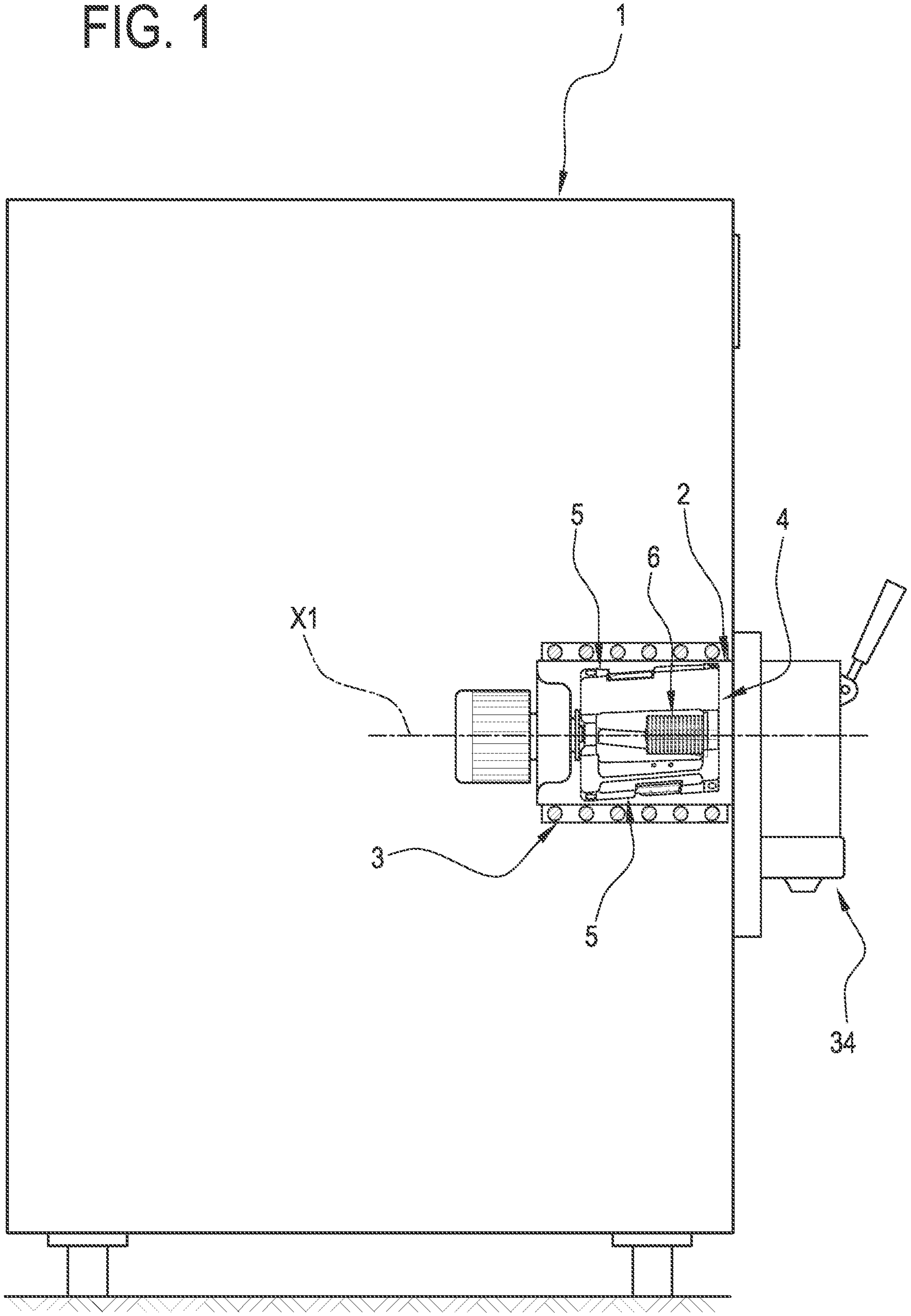
FIG. 1 shows a first embodiment of a machine for making liquid and/or semi-liquid products according to the invention.
Figure 4:
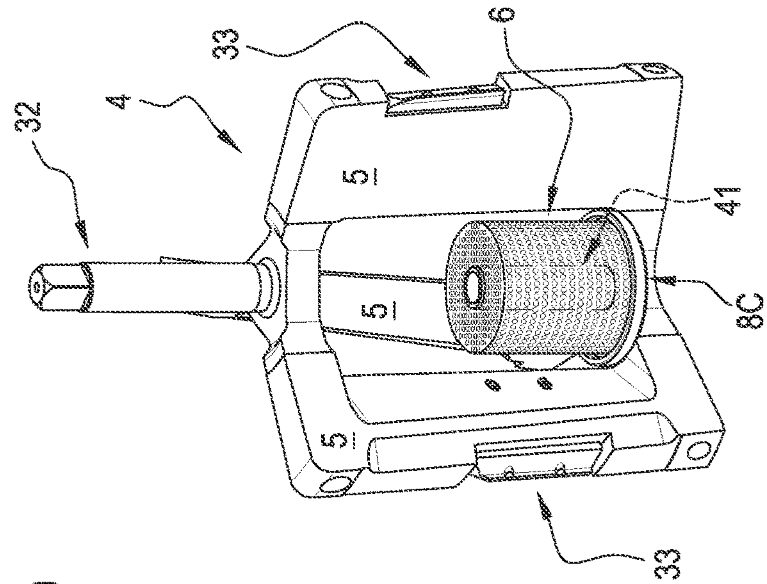
FIGS. 2 to 4 are perspective views of a detail of the machine for making liquid and/or semi-liquid products of FIG. 1.
Figure 3:
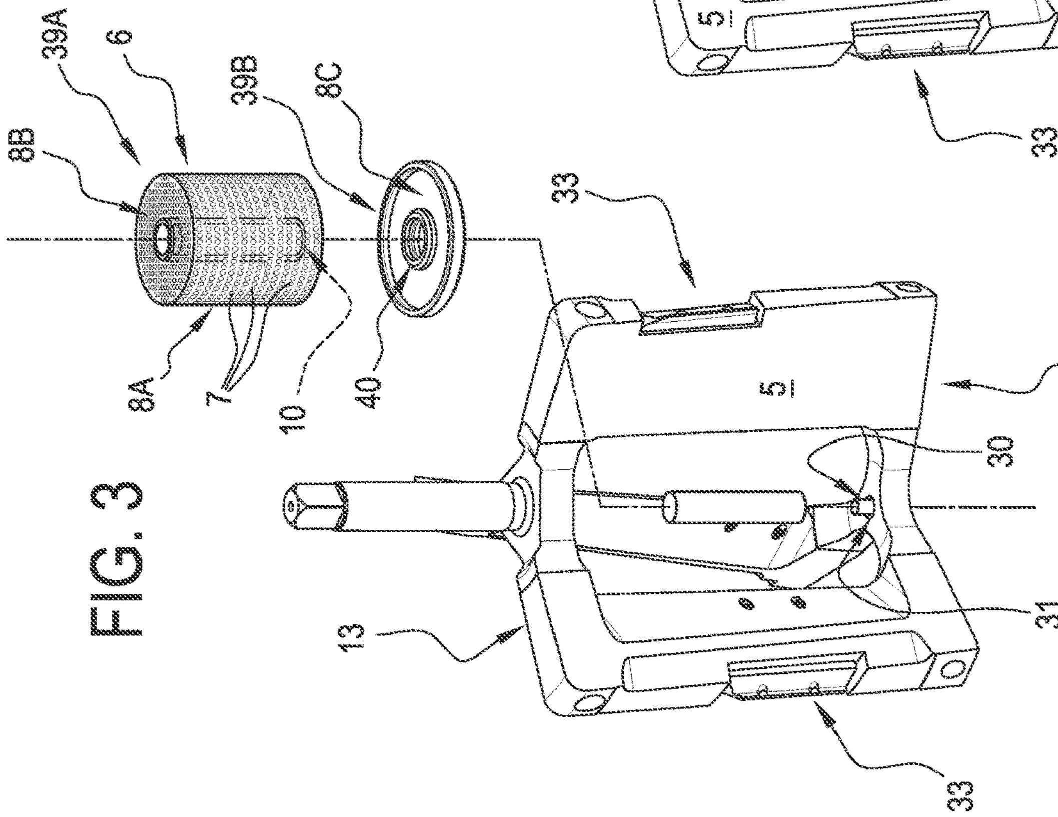
Figure 2:
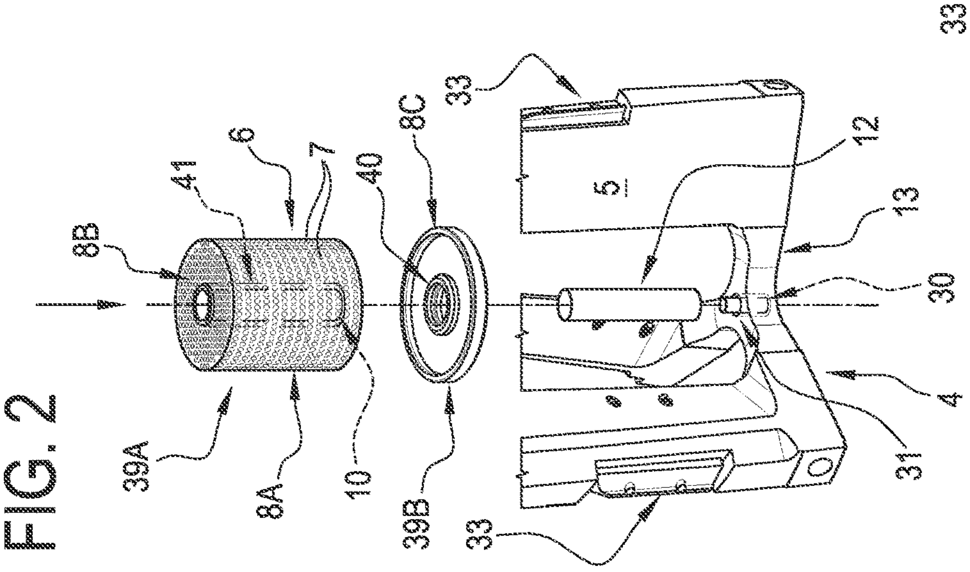

As shown in FIG. 1 and following figures, the numeral 1 denotes a machine for making liquid or semi-liquid products (preferably ice cream type products).

With reference to the machine illustrated in FIG. 1, the machine is a batch freezer.

Figure 5:
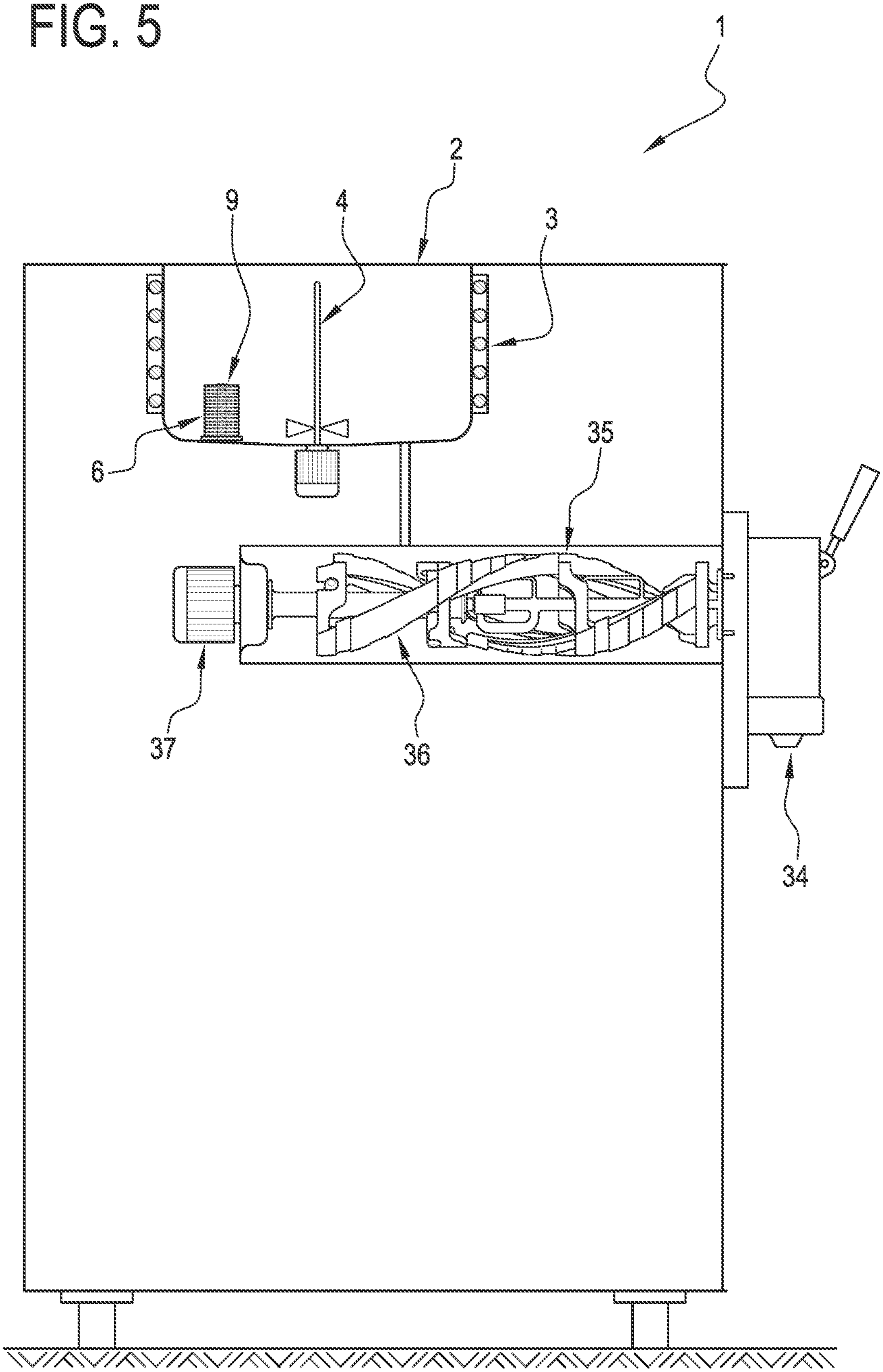
FIG. 5 shows a second embodiment of a machine for making liquid and/or semi-liquid products according to the invention.
Figure 6:
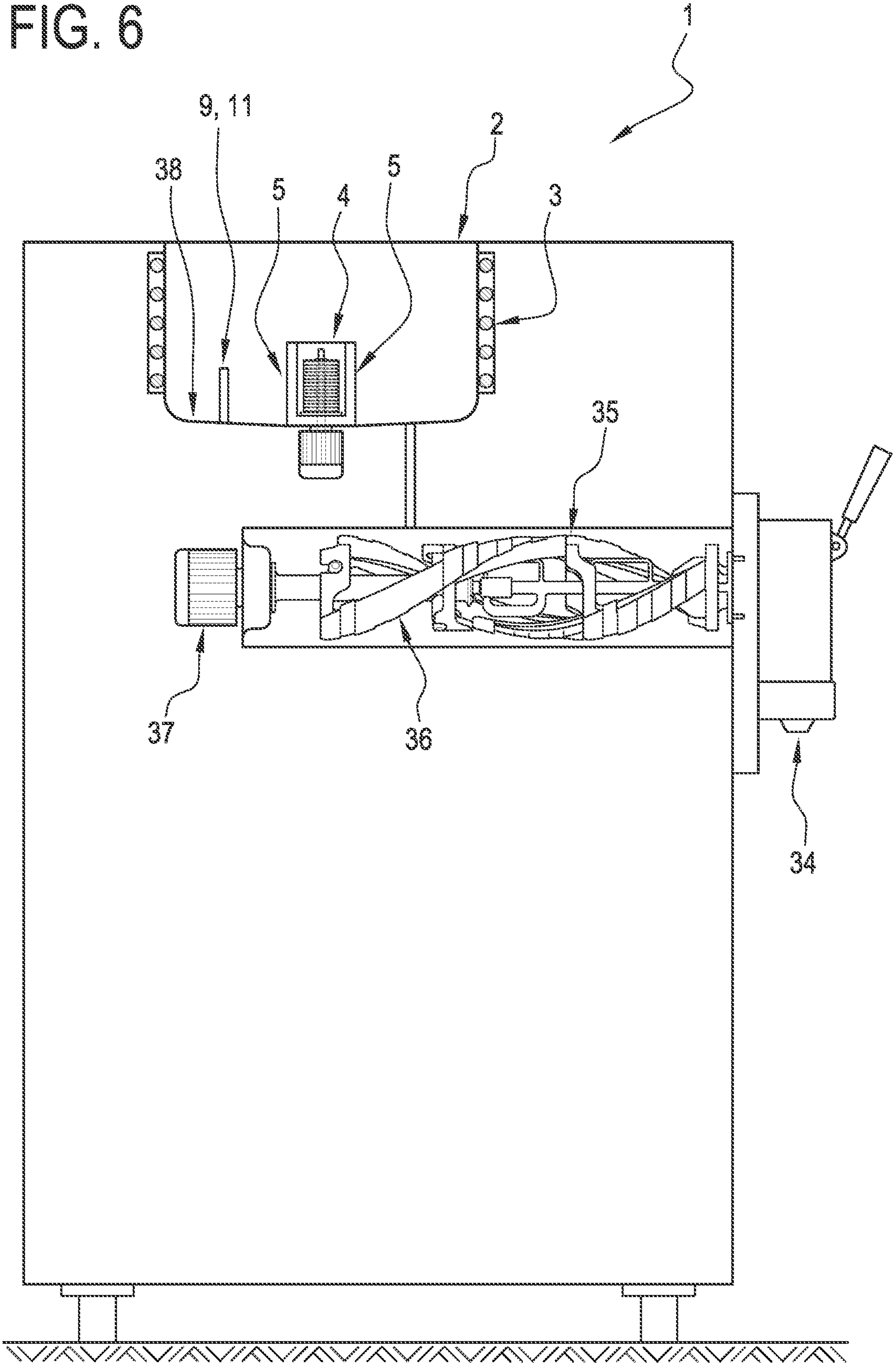
FIG. 6 shows a third embodiment of a machine for making liquid and/or semi-liquid products according to the invention.

FIGS. 5 and 6, on the other hand, show a machine for making liquid or semi-liquid products, in particular soft ice cream type products.

Whatever the embodiment, the machine 1 comprises:

a container 2 adapted to contain a liquid or semi-liquid base product (ice cream mixture);

a thermal treatment system 3 (only partly illustrated in the accompanying drawings) associated with the container 2 to cool or heat the walls of the container 2;

a stirrer 4 equipped with a plurality of radial vanes 5 and, in use, mounted inside the container 2 to mix the liquid base product inside the container.

It should be noted that the thermal treatment system 3 is preferably a thermodynamic system; it comprises a closed circuit containing a heat exchanger fluid.

Preferably, the thermal treatment system 3 comprises a compressor.

According to the invention, the machine 1 further comprises a basket 6 having a plurality of through holes 7 in its walls (8A, 8B), defining an internal space for containing flavorings or the like and, in use, associable with the container 2.

It should be noted that the purpose of the holes 7 is, during processing, to allow the liquid base to come into contact with the flavorings or the like inside the basket and, at the same time, to prevent the flavorings or the like to escape from the basket 6.

The expression “flavorings or the like” is used to mean any flavoring product in the form of leaves, leaf portions, twigs, roots, fruits or berries.

Examples of such flavorings are tea leaves and vanilla pods.

As illustrated in FIG. 1, the container 2 is a cylinder.

Preferably, the cylinder has a horizontal axis.

In the embodiments illustrated in FIGS. 5 and 6, the container 2 is an open-top tank provided with a protrusion 9.

The protrusion 9 is preferably vertical.

The protrusion 9 preferably protrudes from the bottom wall 38 of the tank 2.

It should be noted that the basket 6 has a cavity 10 for coupling with the protrusion 9 (in use, adapted to receive the protrusion 9).

As illustrated in FIG. 5, the protrusion 9 houses a level sensor 11 adapted to detect the level of liquid in the tank 2 (in particular to indicate when the liquid base is nearly finished).

In the embodiments illustrated in FIGS. 1 and 6, on the other hand, the basket 6 is configured, in use, to be removably coupled with the stirrer 4.

In other words, as illustrated in FIGS. 1 and 6, the basket 6 is mounted on the stirrer 4, or coupled removably therewith.

Preferably, according to this aspect, the stirrer 4 has a protrusion 12 and the basket 6 has a coupling cavity 10.

The coupling cavity 10 of the basket 6 is configured to receive the protrusion 12 in such a way as to couple the basket 6 with the stirrer 4 (removably).

It should be noted, in other words, that the protrusion 12 slots into the coupling cavity 10.

Preferably, the protrusion 12 is designed to be removably coupled to a body 13 of the stirrer 4.

As illustrated in the accompanying drawings, the basket 6 comprises at least a first portion 39A and a second portion 39B designed to be coupled to each other to define a containment space.

Preferably, the basket 6 is cylindrical in shape.

The first portion 39A defines a side wall 8A and a (top) base wall 8B of the basket 6.

It should be noted that the first portion 39A further comprises an internally hollow tubular member (preferably cylindrical) fixed to the (top) base wall 8B.

The cylindrical tubular member 41 defines the coupling cavity 10.

As illustrated in the accompanying drawings, both the (top) base wall 8B and the side wall 8A have through openings (or holes) in them.

In other words, preferably the first portion 39A is provided with the aforementioned openings 7.

It should be noted that the basket 6 preferably comprises a bottom base wall 8C.

More precisely, the second portion 39B defines a bottom base wall 8C of the basket 6.

Preferably, the bottom base wall 8C is removably fixable to the side wall 8A.

In use, the bottom base wall 8C is coupled (removably) to the side wall 8A on the side opposite to the top base wall 8B.

It should be noted, therefore, that the side wall 8A and the top wall 8B form part of the same element, that is, they form a single part (first portion 39A).

It should be noted that the coupling cavity 10 is preferably made in the bottom base wall 8C (and is in the form of a hollow).

In other words, the coupling cavity 10 is preferably made in the first portion 39A.

The second portion 39B, on the other hand, has a through opening 40 which, in use, is adapted to be traversed by the protrusion (9, 12).

More preferably, both the bottom base wall 8C and the top base wall 8B define a coupling cavity 10 with a protrusion (9, 12).

In effect, both the opening 40 and the cavity made in the first portion 39A (integral with the top base wall 8B) together define the coupling cavity 10.

According to another aspect, the bottom base wall 8C is designed to be removably coupled to the side wall 8A to define a closed containment space (adapted to contain the flavoring product).

Preferably, the bottom base wall 8C is circular in shape, as is the top base wall 8B.

In use, therefore, the space inside the basket 6 contains the flavoring product.

It should be noted that the bottom base wall 8C is advantageously detachable from the side wall 8A to allow the flavoring product to be placed in or (after the liquid or semi-liquid product has been made) removed from the basket 6.

In other words, in more general terms, the two portions 39A and 39B are detachable from each other to allow the flavoring product to be placed in, or taken out of, the basket 6.

According to another aspect, the top base wall 8B has a housing cavity 10 made in it which is configured to be coupled with a matchingly shaped protrusion (9, 12), the protrusion (9, 12) being, in use, coupled with the container 2 or the stirrer 4, respectively.

According to another aspect, the stirrer 4 comprises a main body 13 which mounts the radial vanes 5.

The stirrer 4 also comprises a protrusion 12 which can be removably coupled to the main body 13 (or irremovably fixed to the main body 13).

As described above, the protrusion 12 is configured to be coupled with the basket 6 (in particular, to be inserted into the cavity 10 of the basket 6).

It should be noted that the protrusion 12 is—preferably but not necessarily—screwed to the main body 13.

Preferably, the protrusion 12 is coupled to the main body 13 by means of a screw 30 which can be inserted freely into a hole 31 made in the main body 13.

The vanes 5 are preferably provided with a plurality of scraping elements which, in use, are in contact with the inside surface of the container 2 (in order to scrape it).

As illustrated in FIG. 1, the container 2 is a cylinder which extends mainly along a horizontal axis.

It should be noted that, in use, the stirrer 4 is connected to a drive motor which sets it in rotation.

More precisely, the stirrer 4 is provided with a shaft 32 (integral with the body 13) configured to be coupled with the drive motor.

As is known, cooling is accomplished using elements surrounding the outside of the container 2 or housed within its sidewalls.

In the solution forming the object of this invention, the stirrer 4 preferably also comprises:

a main body 13 provided with a plurality of vanes or blades 5;

a shaft 32 associated with the stirrer 4 (or rather, with the main body 13 thereof) to rotate it about its axis of rotation;

a plurality of scraping elements 33, each attachable to a vane 5 and provided with elastic means for coupling it with the respective vane 5 (which push the scraping elements outwards relative to the axis of rotation X1) and adapted to continuously scrape the inside wall of the container 2.

Preferably, the machine 1 comprises a dispensing device 34, connected to the container 2, to allow the liquid or semi-liquid product to be extracted.

The vanes 5 in their entirety act as an element for mixing the product inside the container 2, while the scraping elements 33 scrape the inside surface of the container 2 (batch freezing cylinder).

In effect, as is known, batch freezing involves simultaneously cooling and stirring the ice cream and scraping the surface (cold; and inner according to the situation depicted in FIG. 1) of the processing cylinder: that way, air is incorporated in the mixture to give the finished product the right creaminess and consistency.

To guarantee a scraping effect over the entire inside surface of the batch freezing cylinder, the scraping elements are distributed differently along the length of the vanes 5 in a sufficient number to cover the working length for scraping.

With specific reference to the machine of FIGS. 5 and 6, it should be noted that the container 2 is a mixing tank.

In this case, the machine is also provided with a second container 35, under the mixing tank, adapted to process the liquid or semi-liquid base product previously flavored in the tank.

The second container 35 is connectable to the container 2 to receive a base mixture therefrom.

The cooling and mixing process, or batch freezing process, is carried out on the previously flavored, liquid or semi-liquid base product inside the second container 35.

It should be noted that the second container 35 is normally connectable in fluid communication with the first container 2 (for example by way of a duct and related parts for closing/opening the duct).

It should be noted that the second container 35 is provided with its own stirrer 36, mounted inside the second container 35 and connected to a drive motor 37.

Advantageously, ice cream (artisan gelato and/or soft ice cream) flavored with natural flavorings can be made quickly and easily in the machine 1.

It should be noted that the flavoring can be changed and loaded very quickly and easily: indeed, it is sufficient to remove the basket 6 from the container 2 and to open it to load or remove the flavoring.

Advantageously, cleaning and maintenance of the machine according to the invention is extremely easy.

A type of ice cream which is highly appreciated by consumers can thus made quickly and easily.

It should also be noted that the basket 6 may comprise gaskets.

Preferably, the first portion 39A comprises at least one gasket in the (cylindrical) tubular member 41.

Preferably, the first portion 39A comprises at least one gasket in the opening 40.

It should be noted that the soft ice cream machine illustrated in FIGS. 5 and 6 is also equipped with a mixture pressurizing device, interposed between the upper tank 2 and the container 35; this device allows transferring the base mixture from the upper tank to the container 35 while mixing it with air (by pressurizing the mixture).

Alternatively, the mixture can be transferred from the upper tank 2 to the container 35 by gravity (while mixing it with air).

Defined according to the invention is a method for making liquid or semi-liquid (ice cream type) products, comprising the following steps:

preparing a machine 1 according to the present disclosure;

placing the stirrer 4 and the basket 6 inside the container 2;

placing a flavoring product in leaf, twig, fruit or berry form inside the basket 6;

placing a liquid base inside the container 2;

setting the stirrer 4 in rotation so as to stir the liquid base and extract the flavor from the flavoring product present in the basket 6;

cooling the flavored liquid base and simultaneously stirring the same so as to make an ice cream type product.

According to yet another aspect, during the step of setting the stirrer 4 in rotation so as to stir the liquid base and extract the flavor from the flavoring product, the liquid base is heated to a temperature above 40° C. (still more preferably, to a temperature above 60° C.).

According to another aspect, the liquid base comprises a milk mixture.

According to another aspect, the liquid base comprises a milk mixture heated to a temperature above 40° C. (still more preferably, to a temperature above 60° C.).

According to yet another aspect, the liquid base is heated in the container 2.

According to yet another aspect, the step of cooling the flavored liquid base and simultaneously stirring the same so as to make an ice cream type product is carried out inside the container 2.

What is claimed is:

1. A machine for making liquid or semi-liquid products comprising:

a container shaped to contain a liquid or semi-liquid base product;

a thermal treatment system operatively connected with the container to cool or heat walls of the container;

a stirrer including a plurality of radial vanes and, in use, mounted inside the container to mix the liquid or semi-liquid base product inside the container;

a basket including a plurality of walls, including a top base wall, a side wall and a bottom base wall, the basket including plurality of through openings on the plurality of walls, the basket defining an internal space for containing at least one chosen from flavorings and additives, and, in use, mounted inside the container;

the stirrer including a main body which mounts the plurality of radial vanes and a protrusion removably coupled to the main body;

the basket including a coupling cavity shaped to receive the protrusion and couple the basket to the stirrer via the protrusion while the protrusion is simultaneously coupled to the main body;

the basket including a first portion and a second portion coupled to each other to define the internal space;

the first portion including the top base wall;

the first portion including an internal hollow tubular member fixed to the top base wall; the second portion including the bottom base wall and a through opening in the bottom base wall;

the through opening of the second portion and an interior of the internal hollow tubular member of the first portion defining together the coupling cavity; and the basket is enclosed by at least two of the plurality of radial vanes.

2. The machine according to claim 1, wherein the protrusion houses a liquid level sensor.

3. The machine according to claim 1, wherein the machine is an ice cream machine or batch freezer.

4. The machine according to claim 1, wherein the machine is a soft ice cream machine.

5. A method for making liquid or semi-liquid ice cream type products, comprising:

providing a machine, comprising:

a container shaped to contain a liquid or semi-liquid base product;

a thermal treatment system operatively connected with the container to cool or heat walls of the container;

a stirrer including a plurality of radial vanes and, in use, mounted inside the container to mix the liquid or semi-liquid base product inside the container;

a basket including a plurality of walls, including a top base wall, a side wall and a bottom base wall, the basket including plurality of through openings on the plurality of walls, the basket defining an internal space for containing at least one chosen from flavorings and additives, and, in use, mounted inside the container;

the stirrer including a main body which mounts the plurality of radial vanes and a protrusion removably coupled to the main body;

the basket including a coupling cavity shaped to receive the protrusion and couple the basket to the stirrer via the protrusion while the protrusion is simultaneously coupled to the main body;

the basket including a first portion and a second portion coupled to each other to define the internal space;

the first portion including the top base wall;

the first portion including an internal hollow tubular member fixed to the top base wall;

the second portion including the bottom base wall and a through opening in the bottom base wall;

the through opening of the second portion and an interior of the internal hollow tubular member of the first portion defining together the coupling cavity;

the basket is enclosed by at least two of the plurality of radial vanes;

placing the stirrer and the basket inside the container;

placing a flavoring product in leaf, twig, fruit or berry form inside the basket;

placing the liquid or semi-liquid base product inside the container;

setting the stirrer in rotation to stir the liquid or semi-liquid base product and extract flavor from the flavoring product present in the basket; cooling the flavored liquid or semi-liquid base product and simultaneously stirring the flavored liquid or semi-liquid base product to make an ice cream product.

6. The method according to claim 5, wherein during the step of setting the stirrer in rotation to stir the liquid or semi-liquid base product and extract the flavor from the flavoring product, the liquid or semi-liquid base product is heated to a temperature above 40° C.

7. The method according to claim 5, wherein during the step of setting the stirrer in rotation to stir the liquid or semi-liquid base product and extract the flavor from the flavoring product, the liquid or semi-liquid base product is heated to a temperature above 60° C.

8. The method according to claim 5, wherein the liquid or semi-liquid base product comprises a milk mixture.

9. The method according to claim 5, wherein the liquid or semi-liquid base product is heated inside the container.

10. The method according to claim 5, wherein the step of cooling the flavored liquid or semi-liquid base product and simultaneously stirring the flavored liquid or semi-liquid base product to make the ice cream product is carried out inside the container.

* * * * *